(12) United States Patent
Uh

(10) Patent No.: US 9,160,029 B2
(45) Date of Patent: Oct. 13, 2015

(54) SECONDARY BATTERY INCLUDING A CAN HAVING FIRST AND SECOND STEPPED PORTIONS HAVING DIFFERENT DEPTHS

(75) Inventor: Hwail Uh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 382 days.

(21) Appl. No.: 13/041,327

(22) Filed: Mar. 4, 2011

(65) Prior Publication Data

US 2012/0064389 A1 Mar. 15, 2012

(30) Foreign Application Priority Data

Sep. 13, 2010 (KR) ........................ 10-2010-0089412

(51) Int. Cl.
*H01M 2/02* (2006.01)
*H01M 2/04* (2006.01)
*H01M 2/06* (2006.01)
*H01M 2/08* (2006.01)
*H01M 10/04* (2006.01)

(52) U.S. Cl.
CPC ........ *H01M 10/0431* (2013.01); *H01M 2/0217* (2013.01); *H01M 2/0473* (2013.01)

(58) Field of Classification Search
CPC .......................... H01M 2/0217; H01M 2/0473
USPC ....................................................... 429/163
See application file for complete search history.

(56) References Cited

U.S. PATENT DOCUMENTS

| 2008/0274402 A1 | 11/2008 | Uh | |
|---|---|---|---|
| 2009/0311594 A1 | 12/2009 | Uh | |
| 2010/0216012 A1* | 8/2010 | Uh | .................. 429/163 |

FOREIGN PATENT DOCUMENTS

| KR | 10-2005-0080516 A | 8/2005 |
|---|---|---|
| KR | 10-2007-0076172 A | 7/2007 |
| KR | 10-2007-0108765 | 11/2007 |
| KR | 10-0816218 B1 | 3/2008 |
| KR | 10-2009-0128999 A | 12/2009 |

OTHER PUBLICATIONS

KIPO Notice of Allowance dated Aug. 14, 2012 issued to Korean Priority Patent Application No. 10-2010-0089412, 5 pages.
KIPO Office action, dated Dec. 20, 2011, for KR patent application No. 10-2010-0089412, 3 pages.

* cited by examiner

*Primary Examiner* — Sean P Cullen
(74) *Attorney, Agent, or Firm* — Christie, Parker & Hale, LLP

(57) ABSTRACT

A secondary battery includes an electrode assembly; a can having an opening configured to receive the electrode assembly, wherein the can includes a first stepped portion and a second stepped portion on an inner surface adjacent to the opening and wherein the first and second stepped portions have different depths; a cap assembly comprising a cap plate hermetically sealing the opening of the can; and an insulation case located between the electrode assembly and the cap assembly.

9 Claims, 6 Drawing Sheets

SECONDARY BATTERY INCLUDING A CAN HAVING FIRST AND SECOND STEPPED PORTIONS HAVING DIFFERENT DEPTHS

CROSS-REFERENCE TO RELATED APPLICATION

This application claims priority to and the benefit of Korean Patent Application No. 10-2010-0089412, filed on Sep. 13, 2010, in the Korean Intellectual Property Office, the entire content of which is incorporated herein by reference.

BACKGROUND

1. Field

The present invention relates to a secondary battery.

2. Description of Related Art

Often a lithium secondary battery is formed by accommodating an electrode assembly in a can together with an electrolyte, the electrode assembly including a positive electrode plate, a negative electrode plate and a separator, hermetically sealing an upper opening of the can with a cap assembly, and coupling a cap plate of the cap assembly to the resulting can by welding the upper opening of the can.

Before coupling the cap plate of the cap assembly to the can, an insulation case may be inserted into the can to be on the electrode assembly and to prevent an electrical short between the electrode assembly and the cap assembly.

However, since the insulation case is seated on the electrode assembly, it may press against a top portion of the electrode assembly when the cap plate is welded to the can, preceded by folding the positive electrode tab and the negative electrode tab. If the top portion of the electrode assembly is pressed, the separator may deform, which may bring the positive electrode plate and the negative electrode plate into direct contact, resulting in an electrical short. Additionally, since the insulation case is not fixed at a specific location in the can, but rather is movable, it may not be accurately positioned in the electrode assembly, resulting in improper welding of the cap plate. In other words, the welding of the cap plate may be inconsistent.

SUMMARY

Embodiments of the present invention provide a secondary battery having improved assembling performance by guiding assembly of an insulation case inserted into a can to prevent the insulation case from dislodging outward from the can.

Embodiments of the present invention provide a secondary battery having improved reliability in welding a cap plate coupled to a top end of a can by maintaining a stably assembled state after an insulation case is inserted into the can.

Embodiments of the present invention also provide a secondary battery having improved formability of a can and capable of suppressing cracks from being generated in the can by providing short sidewalls and long sidewalls of the can with stepped portions having the same thickness and different depths.

According to one embodiment of the present invention, a secondary battery includes an electrode assembly; a can having an opening configured to receive the electrode assembly, wherein the can includes a first stepped portion and a second stepped portion on an inner surface adjacent to the opening and wherein the first and second stepped portions have different depths; a cap assembly comprising a cap plate hermetically sealing the opening of the can; and an insulation case located between the electrode assembly and the cap assembly.

In one embodiment, a thickness of the first and second stepped portions is substantially identical and the first stepped portion extends to a lesser depth along the can than the second stepped portion. Further, the first stepped portion may be on a short sidewall of the can, and the second stepped portion may be on a long sidewall of the can.

In one embodiment, the cap plate is on the first stepped portion and the insulation case is on the second stepped portion. The insulation case may include a body, a short side support and a long side support extending from the body, and at least one protrusion extending from the long side support. In one embodiment, the insulation case includes two opposing long side supports and two protrusions on each opposing long side support, wherein the protrusion has a semicircular or rectangular shape. In one embodiment, the at least one protrusion further includes a chamfered slant corner which may slant from the long side support toward the body.

According to the embodiments of the present invention, assembly of the battery is improved by guiding assembly of an insulation case inserted into a can to prevent the insulation case from becoming significantly dislodged from the can.

According to the embodiments of the present invention, assembling performance of the battery is further improved by maintaining the cap plate coupled to a top end of the can at a stably assembled state while guiding assembly of an insulation case inserted into the can.

According to the embodiments of the present invention, formability of the can is improved by providing short sidewalls and long sidewalls of the can with the stepped portions having substantially the same thickness and different depths during the formation of the can. Specifically, it is possible to effectively suppress cracks from being generated at the upper opening of the can.

As described above, according to the present invention, the insulation case and the cap plate are accurately positioned at the inside and top end of the can when the cap plate is welded to the top end of the can.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE EMBODIMENTS

Hereinafter, embodiments of the present invention will be described in detail with reference to the accompanying drawings.

Figure 1:
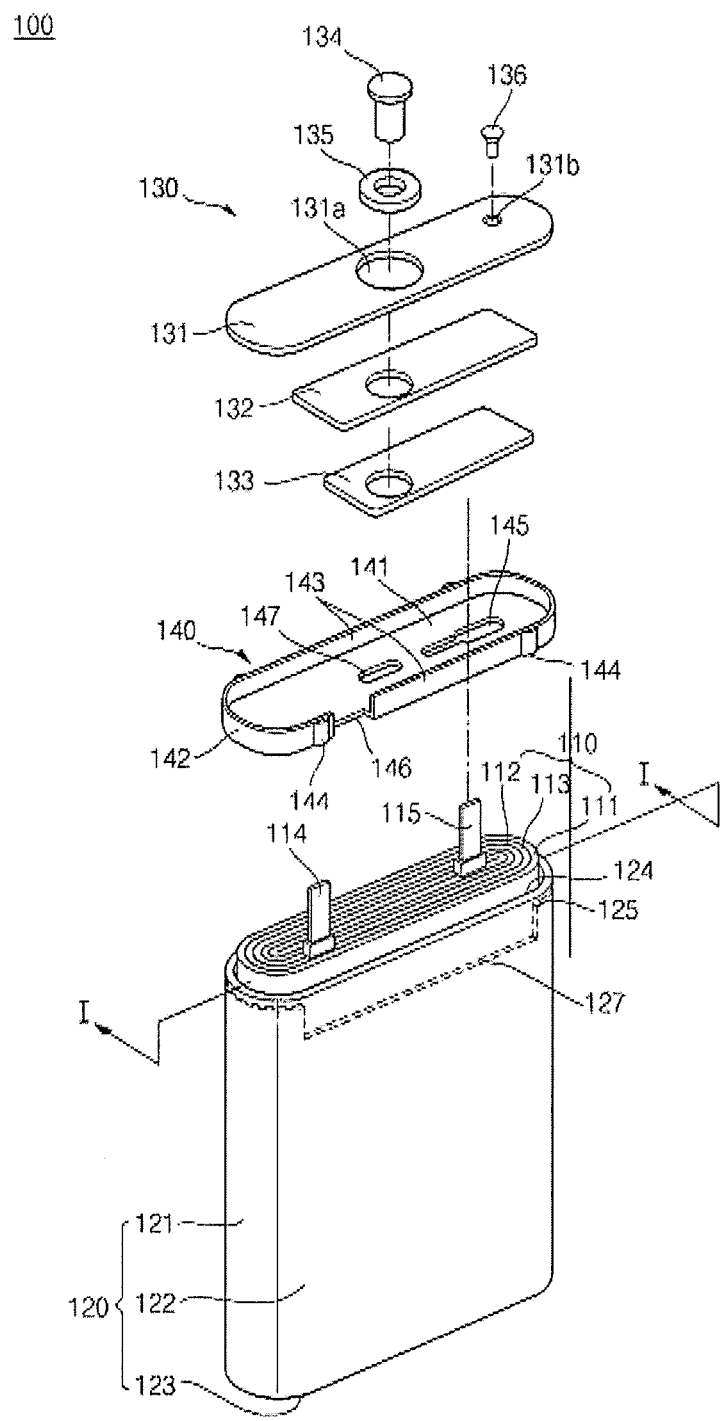
FIG. 1 is an exploded perspective view of a secondary battery according to an embodiment of the present invention.
Figure 2:
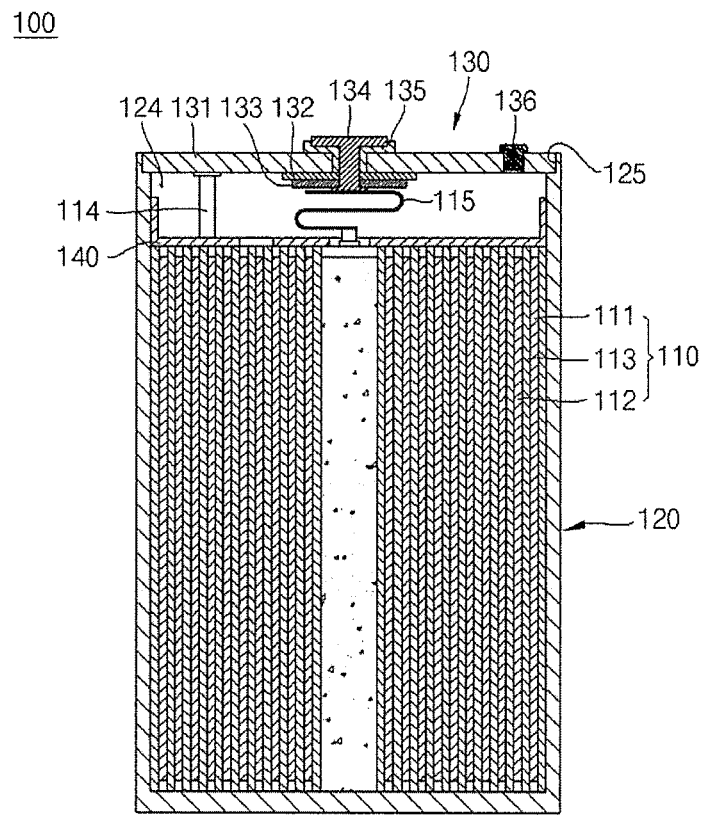
FIG. 2 is a sectional view of the secondary battery, taken along the I-I of FIG. 1.
Figure 3:
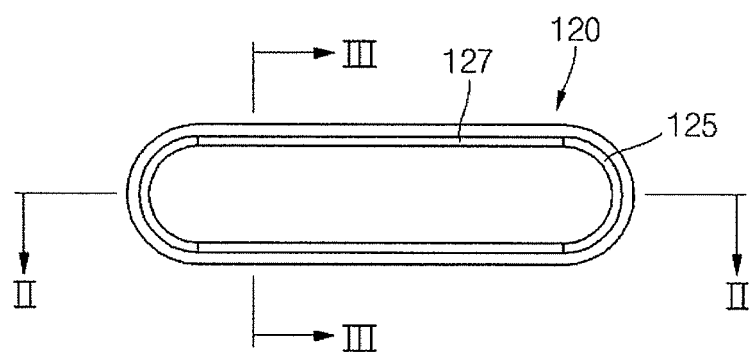
FIG. 3 is a plan view of a can of the secondary battery shown in FIG. 1.
Figure 4A:
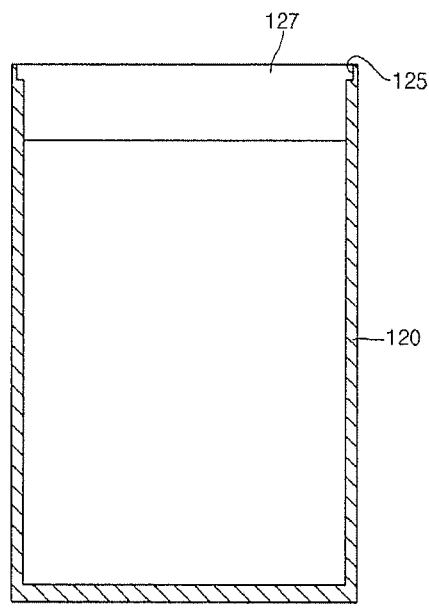
FIG. 4A is a sectional view of the can of the secondary battery shown in FIG. 1, taken along the line II-II of FIG. 3.
Figure 4B:
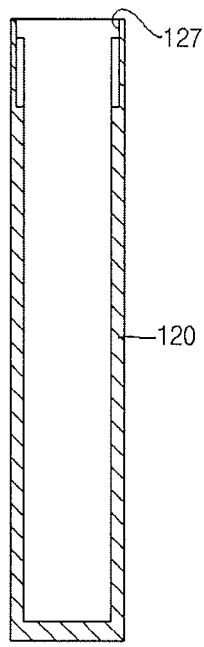
FIG. 4B is a sectional view of the can of the secondary battery taken along the line III-III.
Figure 5:
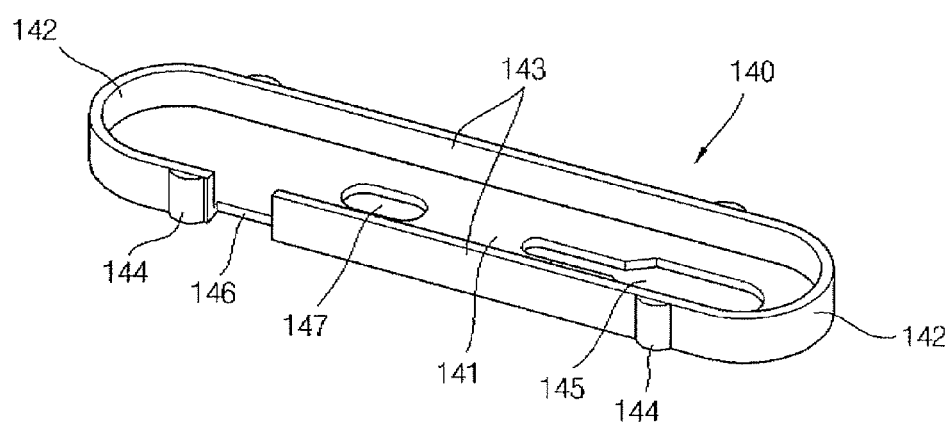
FIG. 5 is a perspective view of an insulation case according to an embodiment of the present invention.
Figure 6A:
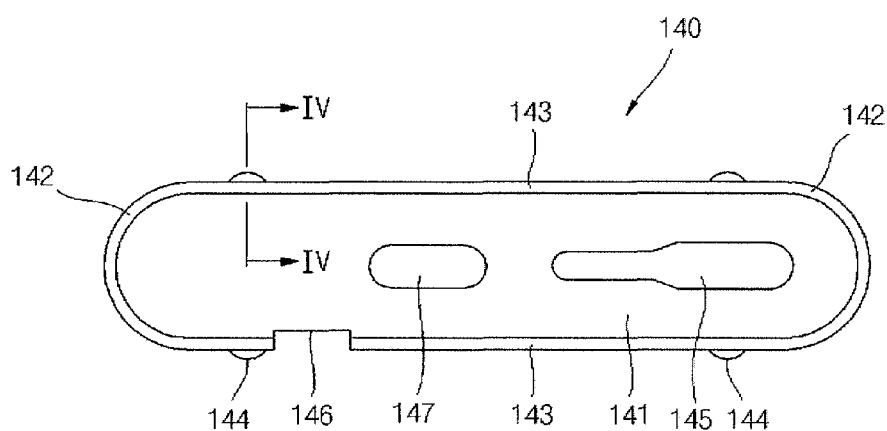
FIG. 6A is a plan view of the insulation case shown in FIG. 5.
Figure 6B:
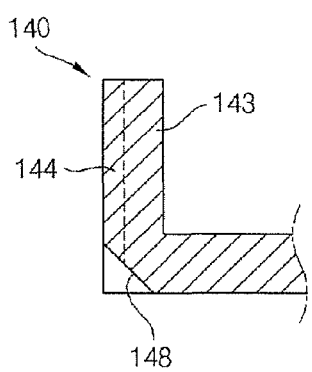
FIG. 6B is a sectional view of the insulation case, taken along the line IV-IV of FIG. 6A.
Figure 7:
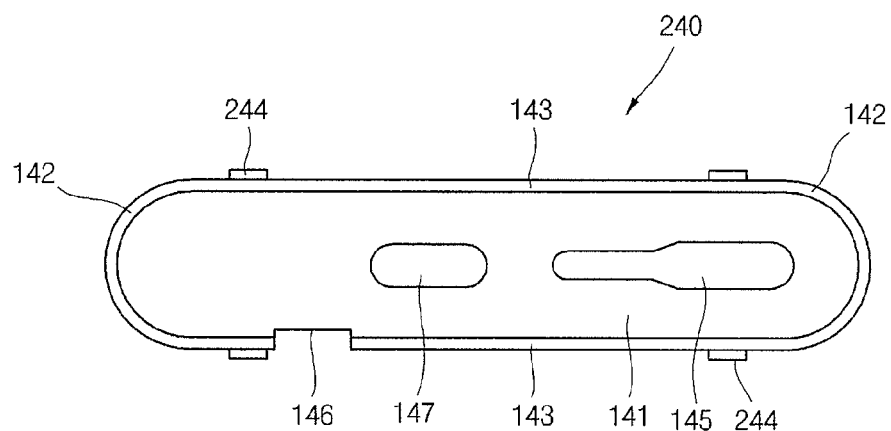
FIG. 7 is a plan view of an insulation case according to another embodiment of the present invention.

FIG. 1 is an exploded perspective view of a secondary battery according to an embodiment of the present invention, FIG. 2 is a sectional view of the secondary battery, taken along the I-I of FIG. 1, and FIG. 3 is a plan view of a can of the secondary battery shown in FIG. 1. FIG. 4A is a sectional view of the can of the secondary battery shown in FIG. 1, taken along the line II-II of FIG. 3, and FIG. 4B is a sectional view of the can of the secondary battery taken along the line III-III. FIG. 5 is a perspective view of an insulation case according to an embodiment of the present invention. FIG. 6A is a plan view of the insulation case shown in FIG. 5, and FIG. 6B is a sectional view of the insulation case, taken along the line IV-IV of FIG. 6A, and FIG. 7 is a plan view of an insulation case according to another embodiment of the present invention.

Referring to FIGS. 1 and 2, the secondary battery 100 according to the embodiment of the present invention includes an electrode assembly 110, a can 120, and a cap assembly 130. In addition, an insulation case 140 is positioned between the electrode assembly 110 and the cap assembly 130.

The electrode assembly 110 is fabricated by stacking positive and negative electrode plates 111 and 112 with a separator 113 located therebetween, and winding the resulting structure into a jelly roll configuration.

A positive electrode tab 114 is coupled to the positive electrode plate 111 to protrude upward from the electrode assembly 110. A negative electrode tab 115 is coupled to the negative electrode plate 112 to protrude upward from the electrode assembly 110. In the electrode assembly 110, the positive electrode tab 114 and the negative electrode tab 115 are spaced from each other to be electrically insulated. In addition, the separator 113 located between the positive electrode plate 111 and the negative electrode plate 112 has a greater width than the positive electrode plate 111 or the negative electrode plate 112, thereby improving insulating performance between the positive electrode plate 111 and the negative electrode plate 112. Therefore, the separator 113 protrudes from top and bottom ends of the electrode assembly 110 wound in a jelly-roll configuration.

The can 120 includes side surface plates including a short sidewall 121 (a first side wall) and a long sidewall 122 (a second side wall) longer than the short sidewall 121, and a bottom surface plate 123 integrally formed with the side surface plates, and is shaped as a roughly square box having a top end opened to form an upper opening 124. The can 120 is formed of a metal member. In one embodiment, the can 120 is made of a lightweight and flexible metal such as aluminum or an aluminum alloy, but aspects of the present invention are not limited thereto. In one embodiment, the can 120 is formed by deep drawing and the side surface plates are integrally formed with the bottom surface plate 123.

The cap assembly 130 includes a cap plate 131, an insulation plate 132, a terminal plate 133, and an electrode terminal 134.

The cap plate 131 is formed of a metal plate sized and shaped to fit the upper opening 124 of the can 120. A terminal throughhole 131a is formed at the center of the cap plate 131. A cap plate electrolyte injection hole 131b is formed at one side of the terminal throughhole 131a. An electrolyte is injected through the electrolyte injection hole 131b and a plug 136 is engaged with the cap plate electrolyte injection hole 131b, thereby hermetically sealing the cap plate 131.

The electrode terminal 134 is inserted into the terminal throughhole 131a, and a tube-shaped gasket 135 for electrical insulation from the cap plate 131 is provided on the outer surface of the electrode terminal 134. The insulation plate 132 is provided under the cap plate 131, and the terminal plate 133 is provided under the insulation plate 132. A bottom surface of the electrode terminal 134 with the insulation plate 132 located therein is electrically connected to the terminal plate 133.

The positive electrode tab 114 is welded to the bottom surface of the cap plate 131, and the negative electrode tab 115 is welded to the terminal plate 133. The positive electrode tab 114 and the negative electrode tab 115 are made of a nickel metal.

Referring to FIGS. 3, 4A and 4B, a first stepped portion 125 and a second stepped portion 127 are formed on the inner surface of the can 120.

The first stepped portion 125 and the second stepped portion 127 are formed in a region generally corresponding to a location of the inner surface of the can 120 where the cap plate 131 and the insulation case 140 are coupled to each other.

In one embodiment, the first stepped portion 125 is formed on the inner surface of the short sidewall 121 of the can 120, and the second stepped portion 127 is formed on the inner surface of the long sidewall 122 of the can 120. In one embodiment, the first stepped portion 125 and the second stepped portion 127 have different depths as measured from, for example, the top edge of the can 120.

In this embodiment, the depth of the first stepped portion 125 is smaller than that of the second stepped portion 127. In other words, the depths of the first stepped portion 125 formed on the inner surface of the short sidewall 121 and the second stepped portion 127 formed on the inner surface of the long sidewall 122 are different from each other.

As described above, if the first stepped portion 125 and the second stepped portion 127 are formed in the inside surface of the short sidewall 121 and the long sidewall 122 to different depths, the cap plate 131 and the insulation case 140 can be stably assembled in the can 120. In addition, since the first stepped portion 125 is thinner than the second stepped portion 127, formability of the can 120 can be increased. Particularly, it is possible to prevent cracks from being generated at the upper opening 124 (typically, the short sidewall portion 121) of the can 120.

In one embodiment, the second stepped portion 127 is formed to a depth enough to allow at least the insulation case 140 to be fully received in the can 120 and to be placed on the electrode assembly 110.

In one embodiment, the thicknesses of the first stepped portion 125 and the second stepped portion 127 are 70% or less of the thickness of the can 120. The thickness of the can 120 is generally 0.3 mm. Thus, when the thicknesses of the first and second stepped portions 125 and 127 are 70% or greater of the thickness of the can 120, the thickness of the can 120 may become excessively small. In one embodiment, when the thickness of the can is 0.3 mm, the thicknesses of the first and second stepped portions are about 0.2 mm or less.

The insulation case 140 is provided on the electrode assembly 110. The insulation case 140 electrically insulates the electrode assembly 110 from the cap assembly 130 and fixes positions of the electrode assembly 110, the positive electrode tab 114 and the negative electrode tab 115.

Referring to FIG. 5, the insulation case 140 includes a body 141, short and long side supports (first and second side supports) 142 and 143 extending from the body 141, and at least one vertical protrusion 144 extending from the side surface of the long side support 143 in a direction generally perpendicular to the bottom surface of the body 141. The insulation case 140 includes an electrode tab drawing hole 145 through which the negative electrode tab 115 extends, an electrode tab drawing groove 146 through which the positive electrode tab 114 extends, and an electrolyte injection hole 147 which provides for a passage into the electrode assembly 110. In one embodiment, the electrode tab drawing groove 146 is formed by cutting a portion of the long side support 143.

The insulation case 140 can be made of an insulating polymer resin. Nonlimiting examples of the insulating polymer resin may include polypropylene (PP), polyphenylenesulfide (PPS), polyethersulfone (PES), modified polyphenyleneoxide (PPO), and so on.

In one embodiment, the vertical protrusion 144 protrudes towards the second stepped portion 127 formed on the inner surface of the can 120. The vertical protrusion 144 is inserted into the second stepped portion 127 formed on the inner surface of the can 120 by an interference fit method when the insulation case 140 is received in the can 120. Therefore, when the insulation case 140 is inserted into the second stepped portion 127 and fixed, significant movement of the electrode assembly 110 is prevented by the insulation case 140, thereby minimizing movement of the positive electrode tab 114 and the negative electrode tab 115 of the electrode assembly 110 and ultimately reducing the risk of a short circuit between the electrodes.

Referring to FIG. 6A, in the insulation case 140 according to an embodiment of the present invention, two vertical protrusions 144 are formed at each of side surfaces of opposite long side supports 143 of the body 141 extending from a first end to a second end and having a constant maximum thickness. Each of the vertical protrusions 144 has a generally semicircular cross-section and is inserted into the second stepped portion 127 from the inner surface of the can 120 by an interference fit method. The thus-formed vertical protrusions 144 have a reduced area contacting the second stepped portion 127, thereby facilitating insertion.

Referring to FIG. 6B, the insulation case 140 includes a chamfered slant surface 148 formed by chamfering a lower corner. In one embodiment, the chamfered slant surface 148 is chamfered to be slanted from the long side support 143 toward the body 141. The chamfered slant surface 148 allows the insulation case 140 to be easily inserted into the second stepped portion 127 by the interference fit method, thereby improving the insertion efficiency of the insulation case 140. As also shown in FIG. 6B, a second end of the vertical protrusion 144 can also be chamfered inwardly toward the body in a direction along a height of the lond side support 143.

Next, an insulation case according to another embodiment of the present invention will be described.

FIG. 7 is a plan view of an insulation case according to another embodiment of the present invention.

Referring to FIG. 7, the insulation case 240 according to the illustrated embodiment of the present invention is different from the insulation case 140 of the secondary battery according to the previous embodiment shown in FIGS. 1 through 6B in view of configuration. Thus, the following description will focus on the insulation case 240. In addition, components the same as or similar to those described above are denoted by the same reference numerals, and detailed explanations thereof will be omitted.

The insulation case 240 includes a square pillar-shaped protrusion 244 having a horizontally cross-section shaped of a rectangle. The protrusion 244 comes into line contact with the second stepped portion 127 from the inner surface of the can 120 to then be inserted into the second stepped portion 127 by an interference fit method. The protrusion 244 has an increased contact area with respect to the second stepped portion 127 of the can 120, so that the area supported after insertion may be increased.

The aforementioned insulation case is assembled with the secondary battery according the embodiment of the present invention in the following manner.

The electrode assembly 110 including the positive electrode plate 111, the separator 113 and the negative electrode plate 112 wound together is first accommodated in the can 120.

Then, the insulation case 140 is inserted into the can 120 through the upper opening 124 of the can 120. Here, the vertical protrusions 144 formed at the long side supports 143 of the insulation case 140 are inserted into the second stepped portion 127 formed in the long sidewall 122 while being guided from the inner surface of the can 120 to the second stepped portion 127. Here, since the vertical protrusion 144 of the insulation case 140 is supported by the second stepped portion 127, it is difficult to dislodge. The cap plate 131 of the cap assembly 130 is seated in the first stepped portion 125.

After the insulation case 140 is inserted, the cap plate 131 is coupled to the upper opening 124 of the can 120 by, for example, welding. Here, the insulation case 140 is assembled at an appropriate position inside the can 120 without excessively pressing the electrode assembly 110 or being too far apart from the electrode assembly 110. Therefore, the cap plate 131 can be stably welded to the upper opening 124 of the can 120 without interference due to defects such as dislodgement of the insulation case 140 from the can 120, thereby providing for welding reliability.

After the cap plate 131 is coupled with the upper opening 124 of the can 120, an electrolyte is injected into the can 120 through the electrolyte injection hole 131b of the cap plate 131, followed by sealing the cap plate electrolyte injection hole 131b with the plug 136.

Although several embodiments of the invention have been shown and described, it will be appreciated by those skilled in the art that changes may be made in these embodiments without departing from the principles and spirit of the invention, the scope of which is defined in the claims and their equivalents.

What is claimed is:

1. A secondary battery comprising:
    an electrode assembly;
    a can having an opening configured to receive the electrode assembly, wherein the can includes a first stepped portion having a first depth and a second stepped portion having a second depth different from the first depth, both the first stepped portion and the second stepped portion being on an inner surface adjacent to the opening;
    a cap assembly comprising a cap plate hermetically sealing the opening of the can; and
    an insulation case located between the electrode assembly and the cap assembly, the insulation case having a chamfered edge, wherein the insulation case comprises a body, a first side support and a second side support both extending away from the body, wherein the second side support is longer than the first side support, and at least one protrusion overlapping the second side support;
    wherein the at least one protrusion extends between a first end and a second end, the second end being closer to the electrode assembly than the first end and wherein the at least one protrusion has a constant maximum thickness from the first end to the second end at which the at least one protrusion forms the chamfered edge which is chamfered inwardly towards the insulation case.

2. The secondary battery of claim 1, wherein the first stepped portion has a first thickness and the second stepped portion has a second thickness that is substantially identical to the first thickness.

3. The secondary battery of claim 1, wherein the first depth is less than the second depth.

4. The secondary battery of claim 1, wherein the first stepped portion is on a first sidewall of the can, and the second stepped portion is on a second sidewall of the can.

5. The secondary battery of claim 1, wherein the cap plate is on the first stepped portion, and the insulation case is on the second stepped portion.

6. The secondary battery of claim 1, wherein the second side support comprises two opposing second side supports and the at least one protrusion comprises two protrusions on each opposing second side support.

7. The secondary battery of claim 1, wherein the at least one protrusion has a semicircular or rectangular shape.

8. The secondary battery of claim 1, wherein the at least one protrusion extends in a direction perpendicular to a surface of the body.

9. The secondary battery of claim 1, wherein the can is a prismatic type.

* * * * *